Nov. 8, 1960 W. A. MASON, JR 2,959,234
UNI-CYCLE TRAILING PLOW
Filed Jan. 16, 1957 2 Sheets-Sheet 1
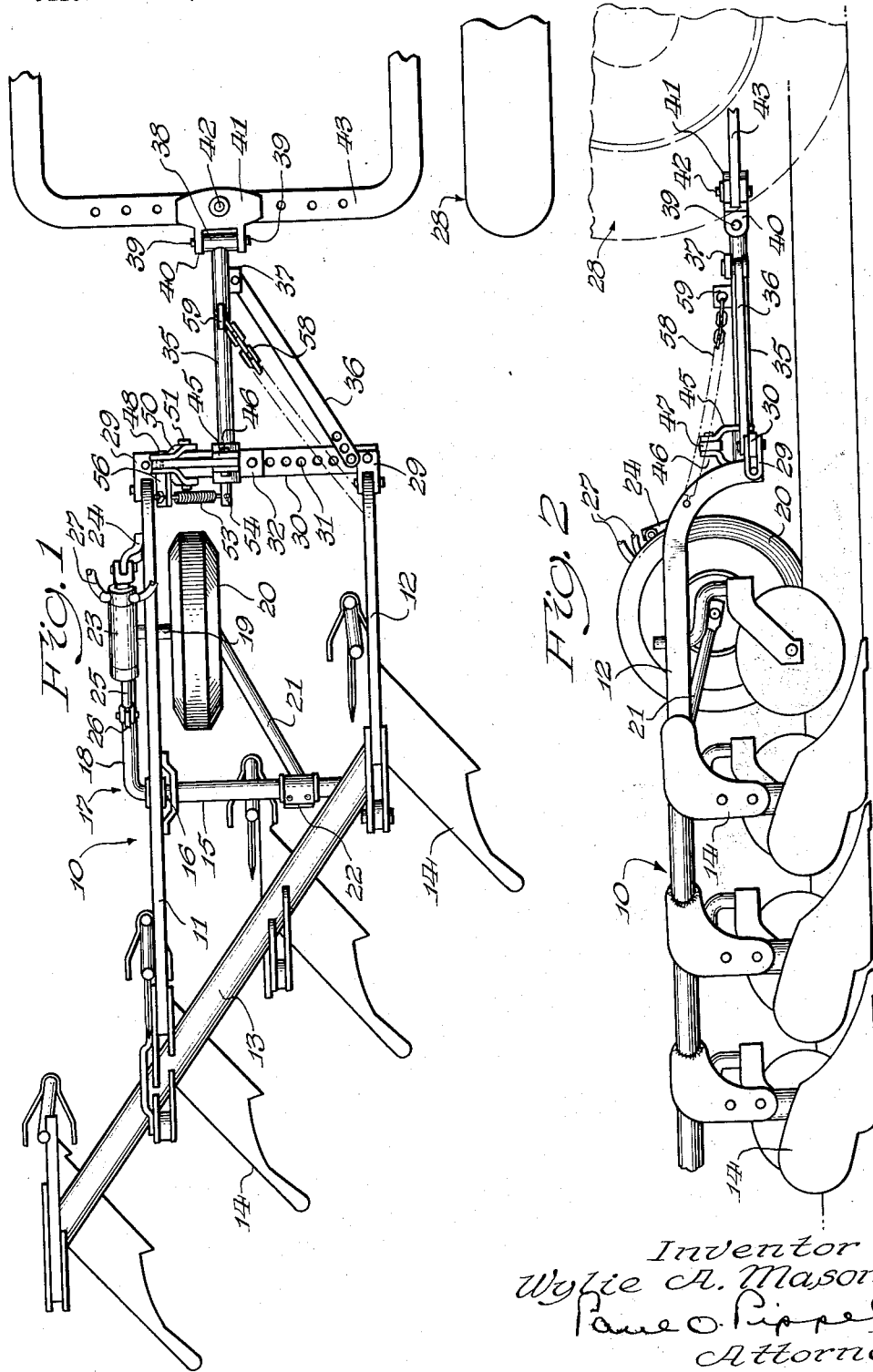
Inventor
Wylie A. Mason, Jr.
Paul O. Pippel
Attorney

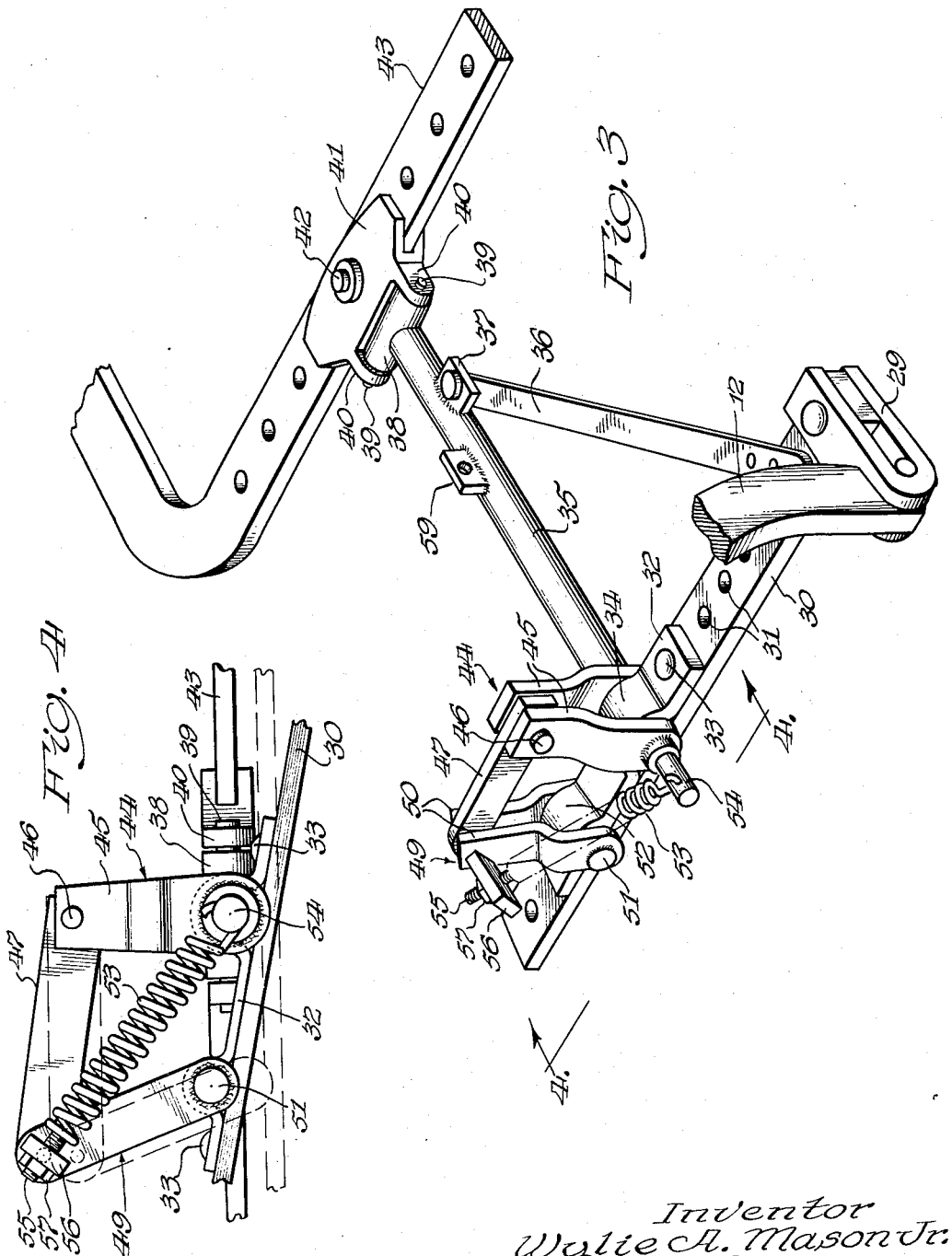

United States Patent Office
2,959,234
Patented Nov. 8, 1960

2,959,234

UNI-CYCLE TRAILING PLOW

Wylie A. Mason, Jr., Memphis, Tenn., assignor to International Harvester Company, Chicago, Ill., a corporation of New Jersey Filed Jan. 16, 1957, Ser. No. 634,471

8 Claims. (Cl. 172—678)

This invention relates to agricultural implements and particularly to plows. More specifically the invention concerns a plow of the trailing type adapted to be propelled by a tractor or the like.

Many agricultural implements such as plows are cumbersome and heavy, and the implement industry is constantly striving to reduce the cost thereof while retaining high standards of performance.

Another object of the invention is to provide a trailing type of plow or the like adapted to be transported on a wheeled support, wherein many conventional features previously thought essential to good plow operation have been eliminated.

Another object of the invention is to provide a unicycle plow wherein the conventional tool-carrying frame is supported on a single wheel and novel means are provided for resisting the normal tendency of the plow to sag to one side of the supporting wheel.

Other objects and advantages of the invention will become clear from the following detailed description when read in conjunction with the accompanying drawings wherein:

Figure 1 is a plan view of a moldboard plow embodying the features of this invention shown connected to a tractor;

Figure 2 is a view in side elevation of the plow shown in Figure 1;

Figure 3 is a view in perspective with parts removed showing the draft structure of the implement and the balancing means resisting sagging of the implement; and Figure 4 is a partial view taken on the line 4—4 of Figure 3.

In the drawings, the numeral 10 designates the generally rectangular horizontal frame of a moldboard plow comprising a pair of laterally spaced longitudinally extending tool beams 11 and 12 of different length, connected at their rear ends by a diagonally extending tubular supporting member 13 upon which are mounted a plurality of plow units 14.

Tool beams 11 and 12 are likewise connected by a transversely extending brace 15 which is tubular and supports the transverse portion 16 of an axle member 17, having a forwardly and downwardly bent crank arm portion 18 bent inwardly to provide an axle portion 19 upon which is mounted a supporting wheel 20. The wheel 20 is further supported by a strap 21 connected at one end to the end of shaft portion 19 and at its other end to a clamp 22 secured to the brace 15.

It will be noted particularly well in Figure 1 that wheel 20 is a land wheel, riding on unplowed ground, and is disposed between the beams 11 and 12 centrally of the implement. Wheel 20 is raised and lowered to move the implement between operating and transport positions by conventional power means such as a hydraulic cylinder 23 pivotally anchored to a bracket 24 secured to the outside of plow beam 11, and having a piston rod 25 slidable therein and pivotally connected to a lug 26 affixed to the crank portion 18 of axle member 17. Fluid under pressure to operate the hydraulic cylinder 23 is supplied through hose lines 27 from a source, not shown, on a tractor indicated at 28.

The forward ends of beams 11 and 12 are curved downwardly and their lower ends are pivotally connected to clevises 29, which are in turn pivotally connected to the ends of a transverse hitch bar 30 forming a part of the plow frame. Hitch bar 30 has therein a plurality of apertures 31 and a bearing strap 32 is secured thereto by bolts 33.

Bearing strap is bent to form a bearing portion 34 in which is rotatably received the rear end of a longitudinally extending draft bar 35, braced by a strap 36 extending diagonally and connected at one end to bar 30 and at its other end to a lug 37 secured to and extending laterally from bar 35. At the forward end of bar 35 is a transverse portion 38 having trunnions 39 at its ends for pivotal connection to a pair of laterally spaced lugs 40 forming a part of a clevis 41 connected by a pin 42 to the drawbar 43 of tractor 28. By virtue of its pivotal connection to clevis 41, draft structure 35 and the implement connected thereto are capable of vertical swinging about the axis of trunnions 39 with respect to the tractor, but draft bar 35 is held against rotation about the horizontal axis thereof.

By virtue of the pivotal connection of hitch bar 30 of the implement with draft bar 35 thereof, sagging of the plow to one side of the supporting wheel 20, in this case the right-hand side, is accommodated. In order to retain the flexibility and maneuverability of the implement while resisting the tendency thereof to sag, an arm 44 comprising longitudinally spaced members 45, is affixed to the rear end of bar 35, members 45 straddling the bearing portion 34 of strap 32 to hold the draft bar in position relative to hitch bar 30. Members 45 project vertically upwardly from the bar 35 and carry a pin 46 upon which is mounted one end of a link 47, the other end of which is mounted upon a pin 48 carried at the upper end of another link 49 comprising longitudinally spaced members 50, the lower ends of which are secured to a shaft 51 rotatable in another bearing portion 52 of strap 32 and straddled by the members 50. The articulated links 47 and 49 form a toggle arrangement fulcrumed at 48, so that a force exerted in a direction to move the pivotal connection of links 47 and 49 toward a centered relationship with respect to the axes of shaft 51 and pin 46 exerts a force downwardly against the left side of hitch bar 30 to maintain the implement frame horizontal and offset the tendency of the plow frame to sag. A yieldable force is exerted by the provision of a coil spring 53 anchored at one end to a reduced extension 54 of bar 35, and at its other end is provided with a threaded bolt 55 slidably receivable in an opening provided in a swivel 56 affixed to one end of pivot pin 48. A nut 57 threaded on the end of bolt 55 abuts the swivel 56 and is manipulated to adjust the tension on spring 53. The effect of spring 53 acting upon the articulated links 47 and 49 is to exert a force in a direction to urge the implement frame to maintain a substantially horizontal position, as indicated in dotted lines in Figure 4.

A chain 58, connected at one end to beam 12, is connected at its other end to a lug 59 secured to draft bar 35, and limits downward pivoting of the draft structure with respect to the implement frame.

It should be clear that applicant has devised an unstable uni-cycle plow having incorporated therein novel means adapted to resist the normal tendency of the plow to sag. The operation of the plow of this invention should be clearly understood from the foregoing description. It should likewise be understood that the invention has been described in its preferred embodiment only and that modifications may be made therein without departing from the spirit of the invention or the scope of the appended claims.

What is claimed is:

1. In a trailing implement adapted to be drawn by a tractor including a frame and earth working units mounted on the frame, the combination of ground supporting means mounted on the frame comprising a single wheel generally centrally mounted on the frame and providing a relatively unstable support for the implement, a longitudinally extending draft bar pivotally connected to the frame to accommodate rocking of the latter relative to said bar about the axis thereof from a normal operating position, means connecting said draft bar to the tractor in draft-receiving relation, and means operatively connecting said bar to said frame arranged to yieldably resist rocking of the latter about the axis of said bar and to hold the frame in its normal operating position.

2. In a trailing implement adapted to be drawn by a tractor including a frame and earth working units mounted on the frame, the combination of ground supporting means mounted on the frame, a longitudinally extending draft bar pivotally connected to the frame to accommodate rocking of the latter relative to said bar about the axis thereof from a normal operating position, means connecting said draft bar to the tractor in draft-receiving relation, and means operatively connecting said bar to said frame arranged to yieldably resist rocking of the latter about the axis of said bar and to hold the frame in its normal operating position, comprising spring means operatively connected at one end to said draft bar and at its other end to said frame, said spring means being arranged to bias said frame to its normal operating position relative to said draft bar and said spring means including a vertical arm secured to the draft bar, a pair of toggle links pivotally connected to said arm and to the frame and a tension spring connected at one end to said draft bar and at the other end to the fulcrum of said toggle links.

3. A uni-cycle plow comprising a horizontal tool-carrying frame, a single supporting wheel mounted on the frame and generally centrally disposed thereon, a draft structure connecting the plow frame to a tractive vehicle, and stabilizing means yieldably resisting sagging of said frame on one side of said supporting wheel, including means forming a longitudinal pivotal connection between the frame and said draft structure, and a yieldable connection between said draft structure and said frame resisting said sagging of the frame about said pivotal connection.

4. A uni-cycle plow comprising a horizontal tool-carrying frame, a single supporting wheel mounted on the frame and generally centrally disposed thereon, a draft structure connecting the plow frame to a tractive vehicle, and stabilizing means yieldably resisting sagging of said frame on one side of said supporting wheel, including means forming a longitudinal pivotal connection between the frame and said draft structure, a yieldable connection between said draft structure and said frame resisting said sagging of the frame about said pivotal connection, comprising an arm affixed to said draft structure, and a spring connecting said arm to said frame and arranged to resist said sagging of the frame about said pivotal connection.

5. A uni-cycle plow comprising a horizontal tool-carrying frame, a single supporting wheel mounted on the frame and generally centrally dispsed thereon, a draft structure connecting the plow frame to a tractive vehicle, and stabilizing means yieldably resisting sagging of said frame on one side of said supporting wheel, including means forming a pivotal connection between the frame and said draft structure, a vertically extending standard affixed to said draft structure, a rock arm pivotally mounted on the frame at a location laterally spaced from the pivotal connection of the latter to said draft structure, a link pivotally connected at one end to said standard and at its other end to the free end of said rock arm, and a spring connecting said rock arm to said draft structure.

6. A uni-cycle plow comprising a horizontal tool-carrying frame, a single supporting wheel mounted on the frame and generally centrally disposed thereon, a draft structure connecting the plow frame to a tractive vehicle, and stabilizing means yieldably resisting sagging of said frame on one side of said supporting wheel, including means forming a pivotal connection between the frame and said draft structure, and a yieldable connection between said draft structure and said frame resisting said sagging of the frame about said pivotal conection including a pair of articulated links in angled relation, an arm affixed to said draft structure and projecting at right angles therefrom, means pivotally connecting one of said links to said arm, means pivotally connecting the other said link to the plow frame at a location laterally spaced from said arm, and a spring operatively connecting said links to said draft structure effective to bias said links toward aligned relation.

7. An unstable agricultural implement adapted for connection to a tractive vehicle, comprising a frame, a plurality of tools mounted on the frame at laterally spaced locations, generally centrally disposed ground engaging means mounted on the frame and providing an unstable support therefor accommodating sagging of the implement to one side of said ground engaging means, a draft bar connected to the vehicle in draft-receiving relation, means forming a longitudinal pivotal connection between the implement frame and said bar permitting said sagging of the implement, and a yieldable connection between said draft bar and said frame operative to resist said sagging of the frame relative to said bar.

8. An unstable agricultural implement adapted for connection to a tractive vehicle, comprising a frame, a plurality of tools mounted on the frame at laterally spaced locations, generally centrally disposed ground engaging means mounted on the frame and providing an unstable support therefor accommodating sagging of the implement to one side of said ground engaging means, a draft bar connected to the vehicle in draft-receiving relation, means forming a pivotal connection between the implement frame and said bar permitting sagging of the implement, a yieldable connection between said draft bar and said frame operative to resist pivoting of the frame relative to said bar, comprising an arm affixed to said bar, and spring means connected to said arm and to said frame on one side of the axis of said bar operative to resist pivoting of the frame in one direction.

References Cited in the file of this patent

UNITED STATES PATENTS

| | | |
|---|---|---|
| 1,408,990 | Dennis | Mar. 7, 1922 |
| 1,986,231 | Thomas | Jan. 1, 1935 |
| 2,022,701 | Wright | Dec. 3, 1935 |
| 2,225,253 | Beyer | Dec. 17, 1940 |
| 2,320,141 | Kott | May 25, 1943 |
| 2,338,334 | Kastenschmidt | Jan. 4, 1944 |
| 2,567,107 | Gobeil | Sept. 4, 1951 |